United States Patent Office 3,264,338
Patented August 2, 1966

3,264,338
2-SUBSTITUTED - 1,3 - PROPANE DITHIOL-DICAR-BAMATES AND 2 - SUBSTITUTED-3-CARBAM-OXY-PROPYLTHIOL CARBAMATES
Bernard J. Ludwig, North Brunswick, N.J., Julius Diamond, Plymouth Meeting, Pa., and Wilfred A. Skinner, Jr., Portola Valley, Calif., assignors to Carter Products, Inc., New York, N.Y., a corporation of Maryland
No Drawing. Filed Apr. 29, 1963, Ser. No. 276,197
7 Claims. (Cl. 260—455)

This invention relates to a new class of compounds which are 2-substituted-1,3-propanedithiol dicarbamates and 2-substituted-3-carbamoxypropylthiol carbamates and to methods for perparing them. The compounds of the present invention have the following general structure:

$$R R_1 C \begin{matrix} CH_2YCNH_2 \\ CH_2ZCNH_2 \end{matrix}$$
(with C=O on each carbamate)

where R and $R_1$ represent hydrogen and hydrocarbon radicals with at least one of said groups being a hydrocarbon radical, and Y and Z represent oxygen and sulfur with at least one of said groups being sulfur. The preferred compounds of this invention are those where R and $R_1$ are lower alkyl or aryl. Specific examples of the preferred dicarbamates of this invention are disclosed in Table I which follows:

TABLE I $$R R_1 C \begin{matrix} CH_2YCNH_2 \\ CH_2ZCNH_2 \end{matrix}$$

| Compd. No. | R | $R_1$ | Y | Z | M.P., °C. | Formula | Calcd.— C | H | N | S | Found— C | H | N | S |
|---|---|---|---|---|---|---|---|---|---|---|---|---|---|---|
| 1 | $CH_3$ | n-$C_3H_7$ | S | S | 99–100 | $C_9H_{18}N_2O_2S_2$ | 43.2 | 7.3 | 11.2 | 25.6 | 43.1 | 7.2 | 11.0 | 25.3 |
| 2 | $CH_3$ | sec-$C_4H_9$ | S | S | 94–96 | $C_{12}H_{20}N_2O_2S_2$ | 45.4 | 7.6 | 10.6 | 24.3 | 45.1 | 7.5 | 10.6 | 23.8 |
| 3 | H | $C_2H_5$ | S | S | 132–134 | $C_7H_{14}N_2O_2S_2$ | 37.8 | 6.3 | 12.6 | 29.8 | 37.8 | 6.1 | 12.8 | 28.6 |
| 4 | $C_2H_5$ | Phenyl | S | S | 112–114 | $C_{13}H_{18}N_2O_2S_2$ | 52.3 | 6.1 | 9.4 | 21.5 | 52.2 | 6.2 | 9.3 | 21.2 |
| 5 | $CH_3$ | n-$C_3H_7$ | S | O | 74–75 | $C_9H_{18}N_2O_3S$ | 46.1 | 7.7 | 11.9 | 13.7 | 46.0 | 7.4 | 11.6 | 12.8 |
| 6 | $CH_3$ | sec-$C_4H_9$ | S | O | 121–124 | $C_{10}H_{20}N_2O_3S$ | 48.4 | 8.1 | 11.3 | 12.9 | 48.1 | 7.9 | 11.0 | 12.8 |

The dithiol dicarbamate compounds of this invention are obtained by (1) reacting an appropriate 2-substituted-1,3-propanediol (I) with an aromatic sulfonyl halide, e.g., p-toluene sulfonyl chloride, to give an aromatic sulfonate ester (II), (2) reacting said aromatic sulfonate ester with an alkali metal thiolacetate in a dimethylformamide solvent to give a thiolacetate ester (III), (3) hydrolyzing said thiolacetate ester to its corresponding dithiol (IV), and (4) converting said dithiol to a dithiol-dicarbamate (V) by reacting it with cyanic acid (HOCN). Cyanic acid may be formed by the treatment of an alkali cyanate with anhydrous hydrogen chloride. The above reactions are as follows, where R and $R_1$ are hydrogen or hydrocarbon radicals, Ar is an aromatic radical and X is a halogen atom.

(1)
$$RR_1C(CH_2OH)_2 + 2ArSO_2X \longrightarrow RR_1C(CH_2OSO_2Ar)_2 + 2HX$$
(I) (II)

(2)
$$RR_1C(CH_2OSO_2Ar)_2 + 2CH_3\overset{O}{\underset{\|}{C}}SM \longrightarrow RR_1C(CH_2S\overset{O}{\underset{\|}{C}}CH_3)_2 + 2ArSO_2OM$$
(III)

(3)
$$RR_1C(CH_2S\overset{O}{\underset{\|}{C}}CH_3)_2 + 2H_2O \longrightarrow RR_1C(CH_2SH)_2 + 2CH_3\overset{O}{\underset{\|}{C}}OH$$
(IV)

(4)
$$RR_1C(CH_2SH)_2 \xrightarrow{HOCN} RR_1C(CH_2S\overset{O}{\underset{\|}{C}}NH_2)_2$$
(V)

The monothiol carbamate compounds of this invention are obtained by a similar series of reactions, except that in step 1 only one mole of aromatic sulfonyl halide is employed for each mole of 2-substituted-1,3-propanediol. The sequence of reaction is as follows:

(1a)
$$RR_1C(CH_2OH)_2 + ArSO_2X \longrightarrow RR_1(CH_2OH)(CH_2OSO_2Ar) + HX$$

(2a)
$$RR_1C(CH_2OH)(CH_2OSO_2Ar) + CH_3\overset{O}{\underset{\|}{C}}SM \longrightarrow RR_1C(CH_2OH)(CH_2S\overset{O}{\underset{\|}{C}}CH_3) + ArSO_2OM$$

(3a)
$$RR_1C(CH_2OH)(CH_2S\overset{O}{\underset{\|}{C}}CH_3) + H_2O \longrightarrow RR_1C(CH_2OH)(CH_2SH) + CH_3\overset{O}{\underset{\|}{C}}OH$$

(4a)
$$RR_1C(CH_2OH)CH_2SH) \xrightarrow{HOCN} RR_1C(CH_2O\overset{O}{\underset{\|}{C}}NH_2)(CH_2S\overset{O}{\underset{\|}{C}}NH_2)$$

From the above described reaction step 4, or 4a, it is seen that the novel thiol dicarbamates of this invention are prepared by reaction of cyanic acid with the appropriate thiol. The intermediate mono and dithiols from which the thiol dicarbamates of Table I are prepared are novel compounds.

The method for preparing the above-mentioned intermediate mono and dithiols is a novel method; this method being the steps 2 and 3, or 2a and 3a, described hereinbefore. Referring to step 2, or 2a, it should be understood that the thiolacetate ester that is formed is not isolated but hydrolyzed to its corresponding thiol in accordance with step 3, or 3a.

More particularly, the above-mentioned method for producing thiol compounds may be described as follows:

A thiol compound having the structure

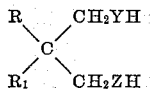

where R and $R_1$ represent hydrogen and hydrocarbon radicals with at least one of said groups being a hydrocarbon radical, and Y and Z represent oxygen and sulfur with at least one of said groups being sulfur, is prepared by reacting an aromatic sulfonate ester having the formula

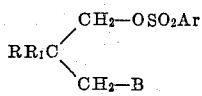

where R and $R_1$ are the radicals defined above, B is a radical selected from the group consisting of —OH and —$OSO_2Ar$, and Ar is an aromatic radical, with an appropriate of an alkali metal thiolacetate having the formula

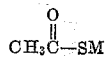

where M is an alkali metal atom, in dimethylformamide solvent to give a thiolacetate ester having the formula

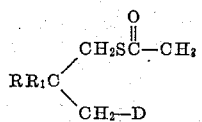

where D is selected from the group consisting of —OH and

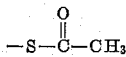

radicals, and hydrolyzing said thiolacetate ester to its corresponding thiol.

With respect to the above-described process for the production of thiols, it has been found that the use of dimethylformamide as a solvent permits the preparation of many thiol compounds that is not possible if ordinary organic solvents such as ether, ethanol and acetone are employed.

In order to illustrate the invention more specifically, the following examples are given. Examples A and B represent the preparation of 2-substituted-1,3-propanedithiols and 2-substituted-3-hydroxypropylthiols. Examples 1 and 2 illustrate the preparation of 2-substituted-1,3-propane dithiol dicarbamates and 2-substituted-3-carbamoxypropylthiol carbamates.

*Example A*

The following is a description of the preparation of 2-methyl-2-propyl-1,3-propanedithiol:

p-Toluenesulfonyl chloride (191 g., 1 mole) was added portion-wise with stirring to a solution of 66 g. (0.5 mole) of 2-methyl-2-propyl-1,3-propanediol in 600 ml. of pyridine. The temperature was maintained at 18–20°. After standing overnight, the mixture was poured into a solution of 1850 ml. methanol, 980 ml. of water and 730 ml. concentrated hydrochloric acid. The mixture was refrigerated overnight and the white crystalline product which separated was filtered off. The product was 2-methyl-2-propyl-1,3-propanediol ditosylate. Yield 160 g. A sample recrystallized from ethanol melted at 67–69°.

*Analysis.*—Calcd. for $C_{21}H_{28}O_6S_2$: S, 14.56. Found: S, 14.85.

A mixture of 48 g. (0.111 mole) of 2-methyl-2-propyl-1,3-propanediol ditosylate and 38 g. (0.333 mole) of dry potassium thiolacetate in 300 ml. of dimethylformamide was heated at its reflux temperature for 18 hours. The cooled mixture was poured into 500 ml. of water, extracted with ether, the ether extract washed with water and dried over anhydrous sodium sulfate. The filtered extract was distilled giving 11 g. (40%) of 2-methyl-2-propyl-1,3-propanedithiol, B.P. 54–56°/0.1 mm., $n_D^{26}$ 1.5107 $d_4^{20}$ 0.993.

*Analysis.*—Calcd. for $C_7H_{16}S_2$: C, 51.1; H, 9.8; S, 39.0. Found: C, 51.3; H, 9.7; S, 39.2.

Also prepared in the above-mentioned manner from the appropriate substituted 1,3-propanedithiol were the following:

2-methyl-2-sec.-butyl-1,3-propanedithiol, B.P. 67–74°/0.1 mm., $n_D^{26}$ 1.5145;

2-ethyl-1,3-propanedithiol, B.P. 84–86°/15 mm.; and 2-ethyl-2-phenyl-1,3-propanedithiol, B.P. 83–85°/0.05 mm., $n_D^{26}$ 1.5840.

In the above-described examples, as well as throughout this disclosure, unless otherwise indicated, reference to temperature degrees means ° centigrade.

*Example 1*

The following is a description of the preparation of 2-methyl-2-propyl-1,3-propanedithiol dicarbamate.

Into a stirred mixture of 4.92 g. (0.03 mole) of 2-methyl-2-propyl-1,3-propanedithiol 4.6 g. (0.066 mole) of dried sodium cyanate, and 25 g. of "Drierite" in 150 ml. of anhydrous alcohol-free chloroform was passed a stream of hydrogen chloride gas for 7 hours. The temperature was maintained at 0° during this addition. After standing overnight at room temperature, the mixture was concentrated at 50° under reduced pressure. The residue was extracted with 100 ml. of trichloroethylene, filtered, and the filtrate triturated with petroleum ether to precipitate the product, 2-methyl-2-propyl-1,3-propanedithiol dicarbamate. The filtered solid, M.P. 95–98°, weighed 3.4 g. (38%). The material after recrystallization from benzene melted at 99–100°.

In the manner illustrated by the above example, other 2-substituted-1,3-propanedithiol dicarbamates were prepared from the corresponding propanediols. The physical constants and analytical values for these compounds are summarized in Table I.

*Example B*

The following is a description of the preparation of 2-methyl-2-propyl-3-hydroxypropylthiol.

To a solution of 13.2 g. (0.1 mole) of 2-methyl-2-propyl-1, 3-propanediol, 7.9 g. (0.1 mole) pyridine and 25 ml. of anhydrous ether cooled to 50° C. was added 19.0 g. (0.1 mole) of p-toluenesulfonyl chloride. The clear solution was maintained at 0° C. for 16 hours. The white precipitate of pyridine hydrochloride was filtered and the ether solution washed with 5% aqueous hydrochloric acid and with water and dried over anhydrous sodium sulfate. The solution was concentrated in vacuo, dissolved in the minimum amount of light petroleum ether and chromatographed on an alumina column. Elution of the column with ether yielded 2-methyl-2-propyl-3-hydroxypropyl tosylate in 58% yield (16.6 g.) as a colorless oil; $N_D^{25}$ 1.5107.

*Analysis.*—Calcd. for $C_{14}H_{22}O_4S$: C, 58.7; H, 7.75; S, 11.2. Found: C, 59.0; H, 7.89; S, 11.4.

A mixture of 14.4 g. (0.0505 mole) of the monotosylate and 11.4 g. of anhydrous potassium thiolacetate (prepared by titration of distilled thiolacetic acid with 3 N potassium hydroxide in methanol) in 60 ml. of dimethylformamide was heated at 95–100° C. under nitrogen with stirring for 2 hours. After standing overnight at room temperature under nitrogen, ether was added to the mixture, and the salts filtered. The ether was removed in vacuo, yielding 7.8 g. (81%) of the crude thiolester. The thiolester was hydrolyzed with 3.8 g. of sodium hydroxide, 25 ml. of water, and 60 ml. of ethanol by stirring for 3 hours in a stoppered flask. The clear, yellow solution was chilled, acidified with 6 N hydrochloric acid and ether extracted. The extracts were washed with water, dried over anhydrous magnesium sulfate, and 4.7 g. of product, 2-methyl-2-propyl-3-hydroxypropylthiol, were obtained by distillation under reduced pressure, B.P. 76–80° C./0.5–0.6 mm., $n_D^{26}$ 1.4875.

*Analysis.*—Calcd. for $C_7H_{16}OS$: C, 56.7; H, 10.9; S, 21.6. Found: C, 56.9; H, 10.9; S, 21.4.

Also prepared in this manner from the appropriate 2-substituted-1,3-propanediol was 2-methyl-2-sec.-butyl-3-hydroxypropylthiol, B.P. 65–66°/0.06 mm.

*Example 2*

The following is a description of the preparation of 2-methyl-2-propyl-3-carbamoxypropylthiolcarbamate.

To a mixture of 2.6 g. (0.0175 mole) of the monothiol, 15 g. of "Drierite," 100 ml. of anhydrous, alcohol-free chloroform, and 3.2 g. (0.049 mole) of sodium cyanate cooled to 5° C. was added anhydrous hydrogen chloride for 5 hours with stirring. The slurry was filtered and concentrated under vacuum. The clear oily residue was dissolved in trichloroethylene, and a crude product melting at 60–66° C. was precipitated, using petroleum ether, B.P. 30–60° C. After recrystallization twice from chloroform-petroleum ether, purified 2-methyl-2-propyl-3-carbamoxypropylthiol carbamate was obtained in the form of white crystals, M.P. 74–75°.

In the manner illustrated by the above example, there was prepared 2-methyl-2-sec-butyl-3-carbamoxypropylthiol carbamate. The physical constants and analytic values for these compounds are summarized in Table I.

The novel thiol carbamates of this invention possess anticonvulsant and muscle relaxant properties.

The invention in its broader aspects is not limited to the specific steps, methods and compositions described but departures may be made therefrom within the scope of the accompanying claims without departing from the principles of the invention and without sacrificing its chief advantages.

What is claimed is:

1. Compounds having the following general structure

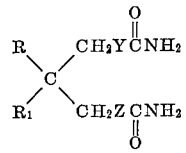

where R and $R_1$ represent hydrogen and hydrocarbon radicals selected from the group consisting of lower alkyl and phenyl radicals with at least one of said groups being a hydrocarbon radical, and Y and Z represent oxygen and sulfur with at least one of said groups being sulfur.

2. 2-methyl-2-propyl-1,3-propanedithiol dicarbamate.
3. 2-methyl-2-sec-butyl-1,3-propanedithiol dicarbamate.
4. 2-ethyl-1,3-propanedithiol dicarbamate.
5. 2-ethyl-2-phenyl-1,3-propanedithiol dicarbamate.
6. 2 - methyl - 2 - propyl - 3 - carbamoxypropylthiol carbamate.
7. 2-methyl-2-sec-butyl - 3 - carbamoxypropylthiol carbamate.

References Cited by the Examiner

UNITED STATES PATENTS

| | | | |
|---|---|---|---|
| 2,177,547 | 10/1939 | Jones | 260—455 |
| 2,436,137 | 2/1948 | Biswell | 260—609 |
| 2,829,171 | 4/1958 | Doumani | 260—609 |
| 2,863,899 | 12/1958 | Harris | 260—455 |
| 2,901,501 | 8/1959 | Wasson et al. | 260—455 |
| 3,073,848 | 1/1963 | Wasson et al. | 260—482 X |

CHARLES B. PARKER, *Primary Examiner.*

D. D. HORWITZ, *Examiner.*

DALE R. MAHANAND, *Assistant Examiner.*